(12) United States Patent
Hayami

(10) Patent No.: US 11,909,935 B2
(45) Date of Patent: Feb. 20, 2024

(54) IMAGE FORMING APPARATUS, AND CONTROL METHOD FOR CONTROLLING IMAGE FORMING APPARATUS FOR REMOTELY PERFORMING A SETTING PROCESS ON OR CONFIGURATION CONTROL OF A IMAGE FORMING APPARATUS

(71) Applicant: CANON KABUSHIKI KAISHA, Tokyo (JP)

(72) Inventor: Yoshikazu Hayami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/050,881

(22) Filed: Oct. 28, 2022

(65) Prior Publication Data

US 2023/0138149 A1     May 4, 2023

(30) Foreign Application Priority Data

Nov. 4, 2021    (JP) ................. 2021-180059

(51) Int. Cl.
    *H04N 1/00*        (2006.01)

(52) U.S. Cl.
    CPC . *H04N 1/00938* (2013.01); *H04N 2201/0094* (2013.01)

(58) Field of Classification Search
    CPC ....... H04N 1/00938; H04N 2201/0094; H04N 1/00411; Y02D 10/00
See application file for complete search history.

(56) References Cited

U.S. PATENT DOCUMENTS

| | | | | |
|---|---|---|---|---|
| 6,360,365 | B1 * | 3/2002 | Curtis ................... | G06F 8/61 717/169 |
| 2001/0029607 | A1 * | 10/2001 | Veres ..................... | G06F 8/61 717/170 |
| 2003/0005427 | A1 * | 1/2003 | Herrero .................. | G06F 8/61 717/178 |
| 2011/0145812 | A1 * | 6/2011 | Kong ................. | H04N 1/00233 717/178 |
| 2014/0282490 | A1 * | 9/2014 | Shinomiya ............... | G06F 8/61 717/174 |
| 2016/0239286 | A1 * | 8/2016 | Tanaka ................... | G06F 8/61 |
| 2017/0351507 | A1 * | 12/2017 | Shantharam ............ | G06F 8/65 |

FOREIGN PATENT DOCUMENTS

JP        2017156829 A      9/2017

\* cited by examiner

*Primary Examiner* — Juan M Guillermety

(74) *Attorney, Agent, or Firm* — Canon U.S.A., Inc. IP Division

(57) ABSTRACT

An image forming apparatus provided to perform a setting process according to a written instruction includes an identifying unit configured to, with respect to a first command included in the written instruction, identify a second command to cancel a process executed with the first command, a creation unit configured to, in a case where an instruction to execute a process with the first command is given according to the written instruction, create a written instruction to execute the second command identified by the identifying unit, and a control unit configured to, according to a user operation, execute the written instruction created by the creation unit.

17 Claims, 15 Drawing Sheets

FIG.7

| No (720) | Written Instruction (700) | | Written Cancellation Instruction (701) | | |
|---|---|---|---|---|---|
| | Command (711) | Parameter (712) | Cancellation Command (713) | Parameter (714) | Data (715) |
| (721) | FirmwareDownload (Download Firmware) | Version Download Number | DownloadDelete (Delete Downloaded File) | File Path | — |
| (722) | FirmwareUpdate (Update Firmware) | Download Number | FirmwareDownload (Download Firmware) | Version Download Number | — |
| | | | FirmwareUpdate (Update Firmware) | Download Number | — |
| (723) | BundleDownload (Download Bundle) | Bundle ID Bundle Version Download Number | DownloadDelete (Delete Downloaded File) | File Path | — |
| (724) | BundleInstall (Newly Install Bundle) | Download Number License Information | BundleUninstall (Uninstall Bundle) | Bundle ID Before Written Instruction Is Executed | — |
| (725) | BundleUpdate (Install Update of Bundle) | Download Number License Information | BundleDownload (Download Bundle) | Bundle ID Before Written Instruction Is Executed Bundle Version | Backup License |
| | | | BundleUpdate (Install Update of Bundle) | Download ID Backup License Path | — |
| (726) | BundleStart (Start Bundle) | Bundle ID | BundleStop (Stop Bundle) | Bundle ID | — |
| (727) | BundleStop (Stop Bundle) | Bundle ID | BundleStart (Start Bundle) | Bundle ID | — |
| (728) | BundleUninstall (Uninstall Bundle) | Bundle ID | BundleDownload (Download Bundle) | Bundle ID Before Written Instruction Is Executed Bundle Version | Backup License |
| | | | BundleInstall (Newly Install Bundle) | Download ID Backup License Path | — |
| (729) | DeviceReboot (Restart Image Forming Apparatus) | — | — | — | — |

FIG.10A

| No (1010) | Written Instruction Number (1001) | Written Instruction Execution Date and Time (1002) | Written Cancellation Instruction (1003) |
|---|---|---|---|
| (1011) | 001 | 2021/5/1/ 00:00 | Written Cancellation Instruction 1 |
| (1012) | 002 | 2021/5/1/ 01:00 | Written Cancellation Instruction 2 |
| (1013) | 003 | 2021/6/1/ 00:00 | Written Cancellation Instruction 3 |

FIG.10B

| No (1030) | Written Instruction Number (1021) | Command Number (1022) | Written Instruction Execution Date and Time (1023) | Command (1024) | Execution Result (1025) |
|---|---|---|---|---|---|
| (1031) | 001 | 1 | 2021/5/1/ 00:00 | FirmwareDownload | Success |
| (1032) | 001 | 2 | 2021/5/1/ 00:00 | FirmwareUpdate | Success |
| (1033) | 002 | 1 | 2021/5/1/ 01:00 | BundleDownload | Success |
| (1034) | 002 | 2 | 2021/5/1/ 01:00 | BundleUpdate | Success |
| (1035) | 002 | 3 | 2021/5/1/ 01:00 | BundleStart | Success |
| (1036) | 003 | 1 | 2021/6/1/ 00:00 | BundleDownload | Success |
| (1037) | 003 | 2 | 2021/6/1/ 00:00 | BundleInstall | Success |

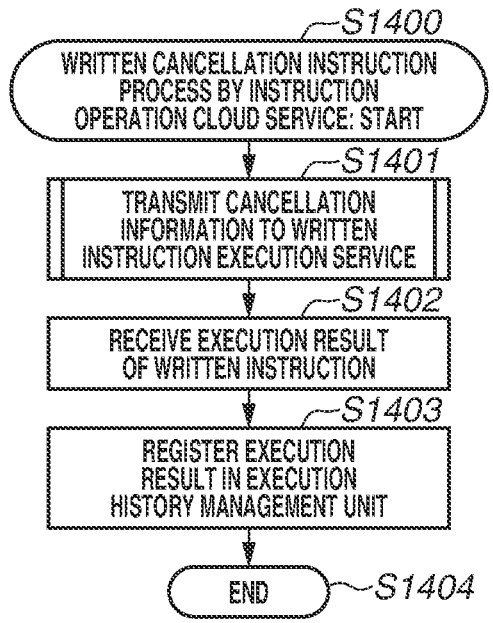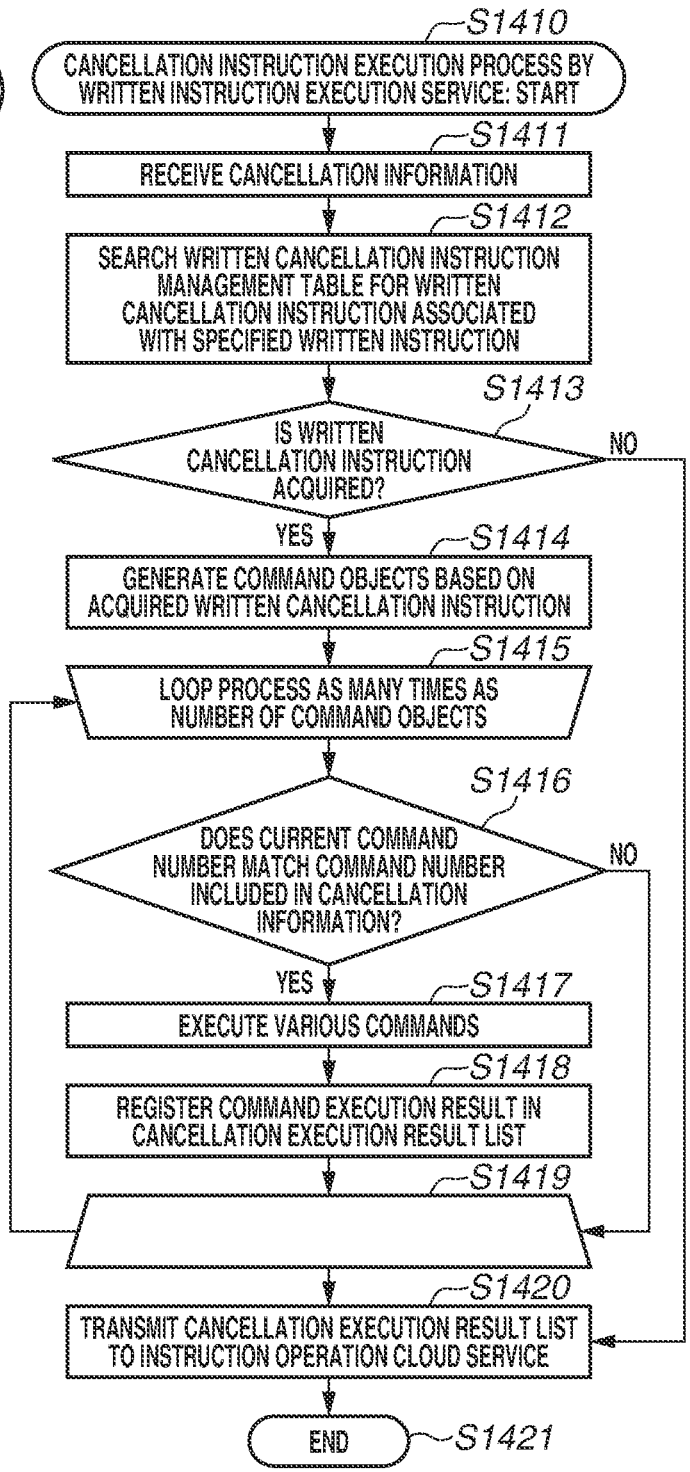

FIG.15

| | Written Instruction (700) | | Written Cancellation Instruction (701) | | |
|---|---|---|---|---|---|
| NO (720) | Command (711) | Parameter (712) | Cancellation Command (713) | Parameter (714) | Data (715) |
| (1501) | BundleStart (Start Bundle) | Bundle ID | BundleStart (Start Bundle) | Bundle ID of Originally Started Login Bundle | — |

IMAGE FORMING APPARATUS, AND CONTROL METHOD FOR CONTROLLING IMAGE FORMING APPARATUS FOR REMOTELY PERFORMING A SETTING PROCESS ON OR CONFIGURATION CONTROL OF A IMAGE FORMING APPARATUS

BACKGROUND

Field

The present disclosure relates to an image forming apparatus, and a control method for controlling an image forming apparatus.

Description of the Related Art

In recent years, to reduce the cost of a service, there is a method for remotely performing a setting process on or configuration control of an image forming apparatus, such as a multifunction peripheral (MFP) on a cloud. The "configuration control" refers to a process of adjusting the configuration of the image forming apparatus with respect to each user, and updating the firmware version of the image forming apparatus where necessary or installing a bundle (an application) purchased by a user. Specifically, a vendor of the image forming apparatus remotely transmits a configuration control instruction to the image forming apparatus. An agent of the image forming apparatus having received the instruction updates the configuration (e.g., a setting value and firmware) of the image forming apparatus according to the instruction. As described above, it is possible to remotely perform what a serviceman conventionally performs through a local screen of the image forming apparatus by visiting a job site. Thus, it is possible to expect a reduction in the cost of a service.

Japanese Patent Application Laid-Open No. 2017-156829 discusses a method for backing up the configuration state of an image forming apparatus at a certain moment and further memorizing a command given after that, thereby changing the configuration of the image forming apparatus back to the configuration state at the certain moment.

Suppose that a command 1 (a state 1 at this time), a command 2 (the state 1 transitions to a state 2), and a command 3 (the state 2 transitions to a state 3) are executed on the image forming apparatus in a state 0. In Japanese Patent Application Laid-Open No. 2017-156829, it is possible to change the state 3 back to the state 1 or 2, but it is not possible to cancel only the command 2.

SUMMARY

Various embodiments of the present disclosure are directed to improving the operability of cancelling a particular command that has been executed and returning back to the state before the command is executed.

According to one embodiment of the present disclosure, an image forming apparatus that performs a setting process according to a written instruction includes an identifying unit configured to, with respect to a first command included in the written instruction, identify a second command to cancel a process executed with the first command, a creation unit configured to, in a case where an instruction to execute a process with the first command is given according to the written instruction, create a written instruction to execute the second command identified by the identifying unit, and a control unit configured to, according to a user operation, execute the written instruction created by the creation unit.

Further features of the present disclosure will become apparent from the following description of example embodiments with reference to the attached drawings.

BRIEF DESCRIPTION OF THE DRAWINGS

FIG. 7 is a command correspondence table of a written instruction and a written cancellation instruction.

FIG. 10A is a diagram illustrating a written cancellation instruction management table managed by a written cancellation instruction management unit. FIG. 10B is a diagram illustrating an execution history management table managed by an execution history management unit.

FIG. 14A is a flowchart illustrating a cancellation instruction process performed by the instruction operation cloud service. FIG. 14B is a flowchart illustrating a cancellation instruction execution process performed by the written instruction execution service.

FIG. 15 is a correspondence table of a command to give a bundle start instruction and a cancellation command in a case of a login bundle.

DESCRIPTION OF THE EMBODIMENTS

With reference to the drawings, example embodiments for carrying out the present disclosure will be described below.

In a first example embodiment, a description will be given of basic processes of generation, management, and execution of a basic written instruction and a written cancellation instruction to cancel the basic written instruction.

Figure 1:
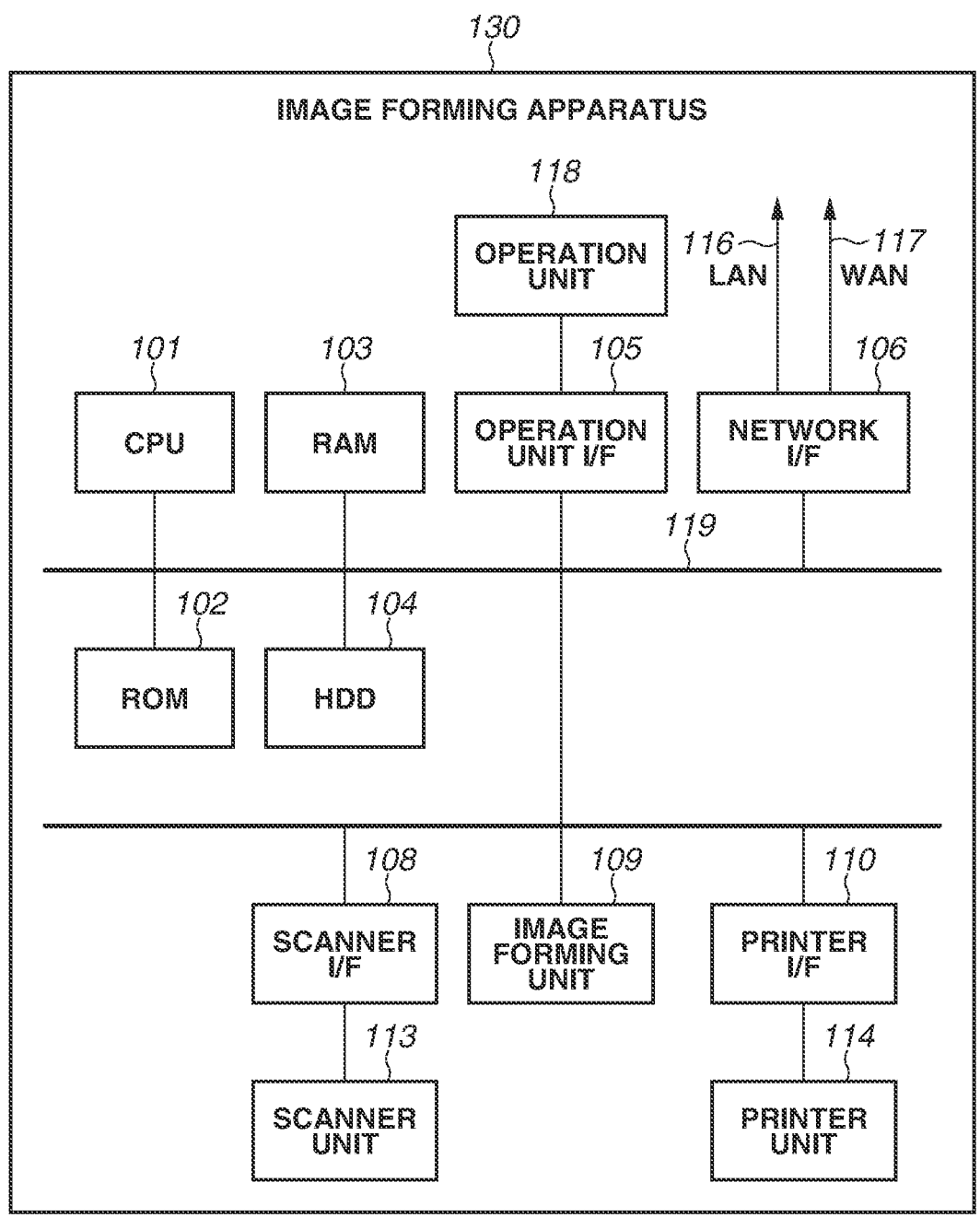
FIG. 1 is a diagram illustrating a hardware configuration of an image forming apparatus.

FIG. 1 is a hardware configuration diagram of an image forming apparatus 130 having, for example, a print function, a scan function, and a network communication function.

The image forming apparatus 130 is electrically connected to a scanner unit 113 and a printer unit 114, and on the other hand, is connected to an external device via a local area network (LAN) 116.

A central processing unit (CPU) 101 performs overall control of access to and from various pieces of hardware to which the CPU 101 is connected according to a control program stored in a read-only memory (ROM) 102. The CPU 101 also performs overall control of various processes performed within a controller.

The ROM 102 is a read-only non-volatile storage area and stores a boot program and firmware of the image forming apparatus 130.

A random-access memory (RAM) 103 is a system work memory for the CPU 101 to operate and is a memory for temporarily storing various pieces of data. The RAM 103 is composed of, for example, a non-volatile static RAM (SRAM), a non-volatile ferroelectric RAM (FRAM) (registered trademark), or a volatile dynamic RAM (DRAM).

A hard disk drive (HDD) 104 is a non-volatile storage area and stores, for example, a system bundle and an additional bundle. A "bundle" here refers to an application (a program). The firmware of the image forming apparatus 130 is stored in the HDD 104. Even if the HDD 104 is replaced due to a breakdown, the RAM 103 is not influenced.

An operation unit interface (I/F) 105 is an interface unit that connects a system bus 119 and an operation unit 118. Specifically, the operation unit I/F 105 receives data to be displayed on the operation unit 118 from the system bus 119 and displays the data, and also outputs input information from the operation unit 118 to the system bus 119. A user gives an instruction to the image forming apparatus 130, and the image forming apparatus 130 presents information to the user through the operation unit 118.

A network I/F 106 connects to the LAN 116, a wide area network (WAN) 117, and the system bus 119 to input and output information from and to outside.

A scanner I/F 108 corrects, processes, and edits image data received from the scanner unit 113.

An image forming unit 109 changes the direction of image data, and compresses and decompresses an image of the image data.

A printer I/F 110 receives image data sent from the image forming unit 109, forms an image, and then causes the printer unit 114 to print the image. Although the present example embodiment is described using the image forming apparatus 130, such as a multifunction peripheral (MFP), as an example, any device that performs processing based on a written instruction may be used, and the present invention is not limited to embodiments using an MFP.

Figure 2:
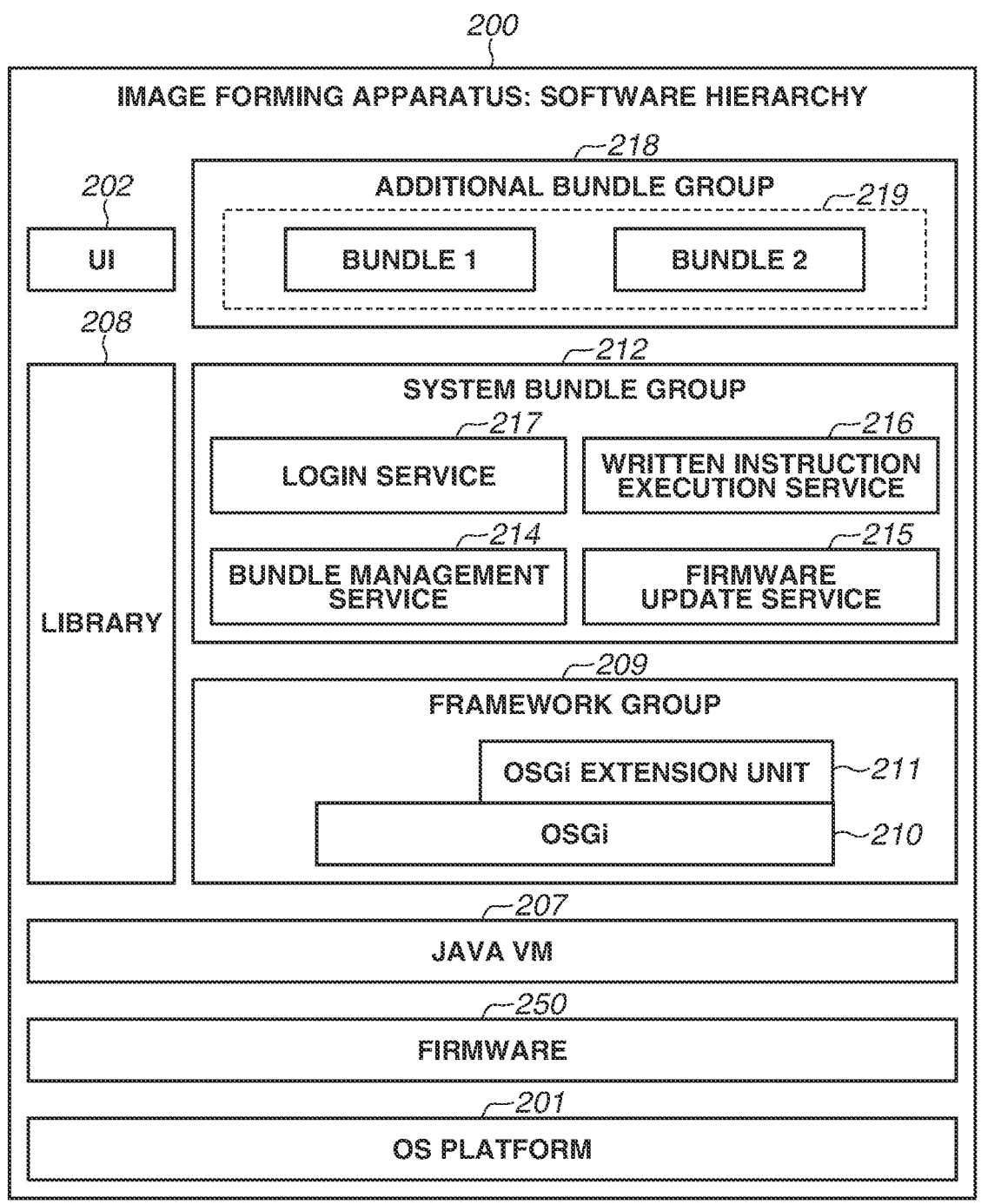
FIG. 2 is a diagram illustrating a software module hierarchy of the image forming apparatus.

FIG. 2 illustrates a software module hierarchy 200 of the image forming apparatus 130. Pieces of software illustrated in FIG. 2 and subsequent figures are stored in the ROM 102 or the HDD 104 and executed by the CPU 101. Various pieces of information used when the pieces of software are executed are held in the RAM 103 or the HDD 104, and the various pieces of information are exchanged between software functions. Further, communication with an external device is performed via the network I/F 106.

The pieces of software will now be described. The pieces of software include an operating system (OS) platform 201.

Firmware 250 performs basic control of hardware built into the image forming apparatus 130. The firmware 250 is updated, whereby a function can be added to the image forming apparatus 130.

A user interface (UI) 202 is a user interface module and is a module that, when an operator performs various operations and makes various settings on the image forming apparatus 130, mediates between the apparatus and the user operations. According to an operation of the operator, this module transfers input information to various modules and requests the various modules to perform processing or change the setting of data.

The configuration on the Java® side will now be described. A software platform on the Java side is configured as the runtime environment of a Java virtual machine (VM) 207, and includes the Java VM 207 as an interpreter, a library 208, and a framework group 209.

The library 208 includes a standard application programming interface (API) library. The framework group 209 includes the Open Services Gateway Initiative (OSGi) 210. The OSGi 210 causes the single Java VM 207 to run a plurality of bundles. An OSGi extension unit 211 is a module that serves as an implementation portion for the OSGi 210 as an interface specification. The OSGi extension unit 211 can extend a function where necessary as far as the specification of the OSGi 210 is satisfied. The OSGi 210 and the OSGi extension unit 211 manage the life cycles of bundles and provide a communication function between the bundles.

On the OSGi 210, a plurality of system bundle groups 212 is present. The system bundle groups 212 include basic built-in functions of the image forming apparatus 130, such as a copy function, a scan function, and a print function (not illustrated).

A bundle management service 214 is a system bundle that manages the life cycles of bundles, such as the additional installation, the installation of updates, the uninstallation, the start, and the stop of a plurality of bundles.

A firmware update service 215 is a system bundle that installs the downloaded firmware 250.

A written instruction execution service 216 is a system bundle that analyzes a written instruction for a configuration change instruction received from a cloud and executes processes in specified order. If an instruction to install an additional bundle 219 is given in this instruction, the written instruction execution service 216 requests the bundle management service 214 to install the downloaded additional bundle 219. If, in contrast, an instruction to update the firmware 250 is given in this instruction, the written instruction execution service 216 requests the firmware update service 215 to update the downloaded firmware 250.

A "written instruction" here refers to data including a command for processing to be executed by the image forming apparatus 130. Examples of the command include the installation and an update of firmware, the installation and an update of an application, and the setting of and a change in a setting value.

A login service 217 is a service that serves as an authentication management function of the image forming apparatus 130. The login service 217 has a mechanism where only a single login service can operate at a time to manage the image forming apparatus 130. That is, to newly use a login service, it is necessary to once stop a login bundle that has originally operated, and then start another login bundle that should newly operate.

In contrast to the system bundle group 212, there is an additional bundle group 218 in which bundles are installed later. As a typical example of the additional bundle group 218, a bundle 219 is an application that provides various functions to the user in the image forming apparatus 130. The various functions include an image processing function, an authentication management function, and a department management function such as print restriction. For example, to uniquely manage authentication in the authentication management function, it is possible to install an additional login bundle having this management function, and switch the login service 217 to the newly installed login bundle to use the login bundle.

The additional bundle 219 that achieves various functions operates under control of the bundle management service 214. The bundle management service 214 holds bundle information including the bundle identifier (ID) and the bundle version of an added bundle. A bundle can be uniquely identified based on a bundle ID and a bundle version. Alternatively, a particular version of a bundle may be able to be identified based on a bundle ID.

Figure 3:
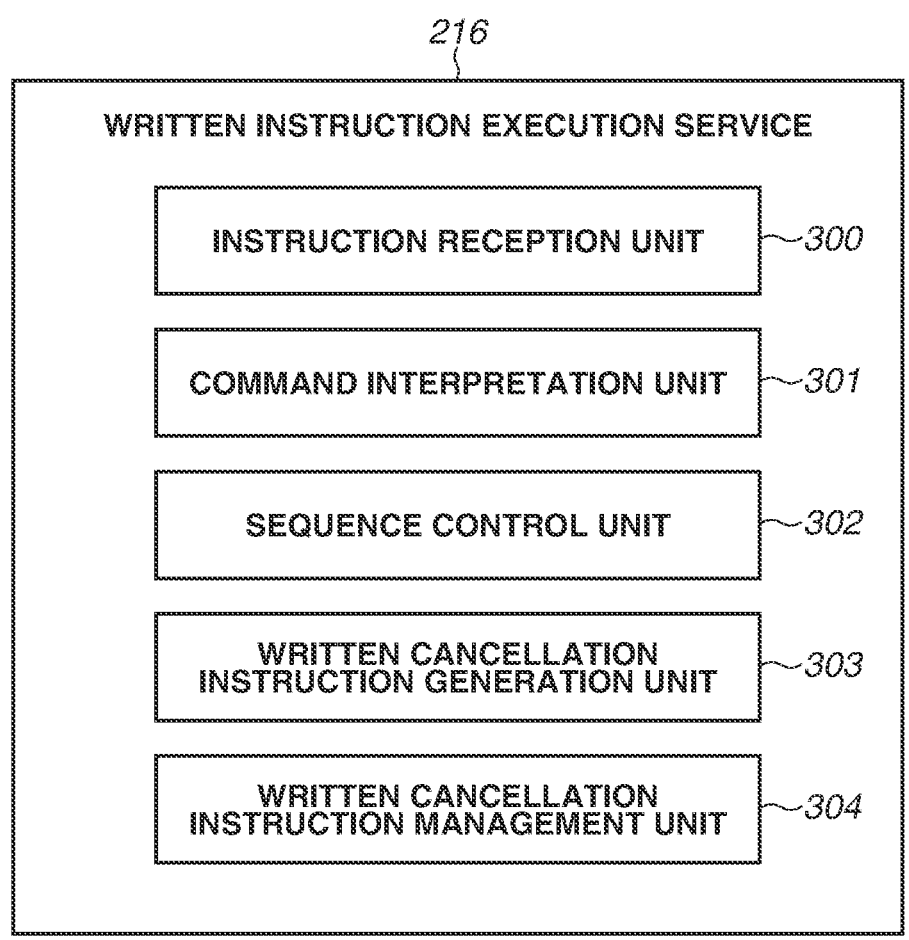
FIG. 3 is a block diagram illustrating a module configuration of a written instruction execution service.

FIG. 3 is a block diagram illustrating the module configuration of the written instruction execution service 216. An instruction reception unit 300 is a module that receives a written instruction composed of a plurality of commands from the cloud. The written instruction may be transmitted from the cloud, or the instruction reception unit 300 may be able to acquire the written instruction saved in a storage medium, such as a Universal Serial Bus (USB) memory.

A command interpretation unit 301 is a module that interprets commands described in the received written instruction. Since the commands include a parameter determined with respect to each command illustrated in FIG. 7, the command interpretation unit 301 acquires the parameter and generates a command object with respect to each command. The command object holds the command and the parameter required for the command as a set. Hereinafter, executing a command object will be referred to as "executing a command" for convenience of description.

A sequence control unit 302 is a module that sequentially executes the command objects generated by the command interpretation unit 301. After each command object is executed, a written cancellation instruction generation unit 303 generates a cancellation command corresponding to the executed command illustrated in FIG. 7. At this time, the written cancellation instruction generation unit 303 acquires a parameter required with respect to each cancellation command and generates the cancellation command to store. After all the commands described in the written instruction are executed, the written cancellation instruction generation unit 303 generates all the stored cancellation commands as a written cancellation instruction. All the written instructions and commands are assigned unique IDs. Written cancellation instructions and cancellation commands to be generated are also assigned unique IDs. These IDs are used to identify a written cancellation instruction or a cancellation command.

A written cancellation instruction management unit 304 is a module that manages the written cancellation instruction generated by the written cancellation instruction generation unit 303. If an inquiry is made to the written cancellation instruction management unit 304 using a written instruction number (ID) and a command number (ID), a written cancellation instruction and a cancellation command corresponding to the written instruction number and the command number are identified. The written cancellation instruction management unit 304 also manages data required for a cancellation command as cancellation data. When a cancellation command is executed, cancellation data related to the command can be used.

Figure 4:
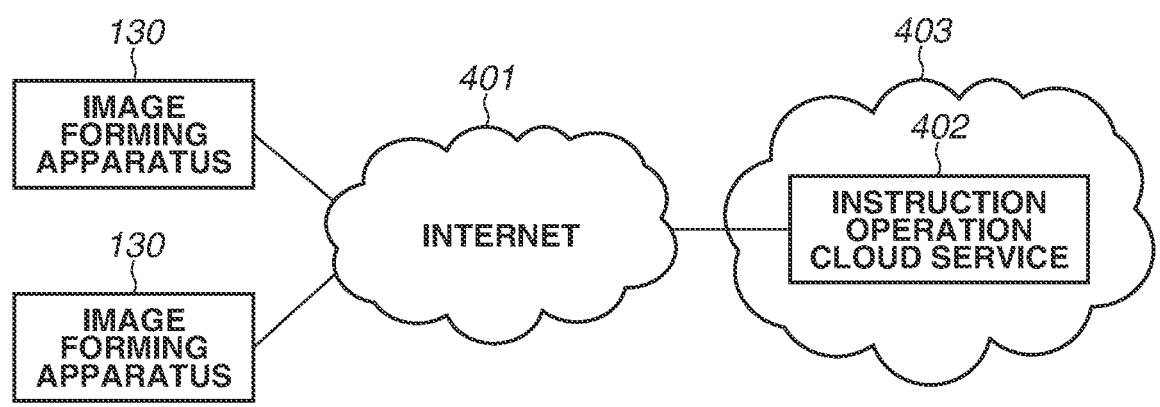
FIG. 4 is a block diagram illustrating a network configuration of the image forming apparatus and an instruction operation cloud service.

FIG. 4 is a block diagram illustrating the network configuration of the image forming apparatus 130 and an instruction operation cloud service 402.

The image forming apparatus 130 communicates with an instruction operation cloud service 402 on a cloud 403 via the Internet 401. The instruction operation cloud service 402 transmits a written instruction to the image forming apparatus 130 via an instruction operation UI and controls the configuration of the image forming apparatus 130.

Figure 5:
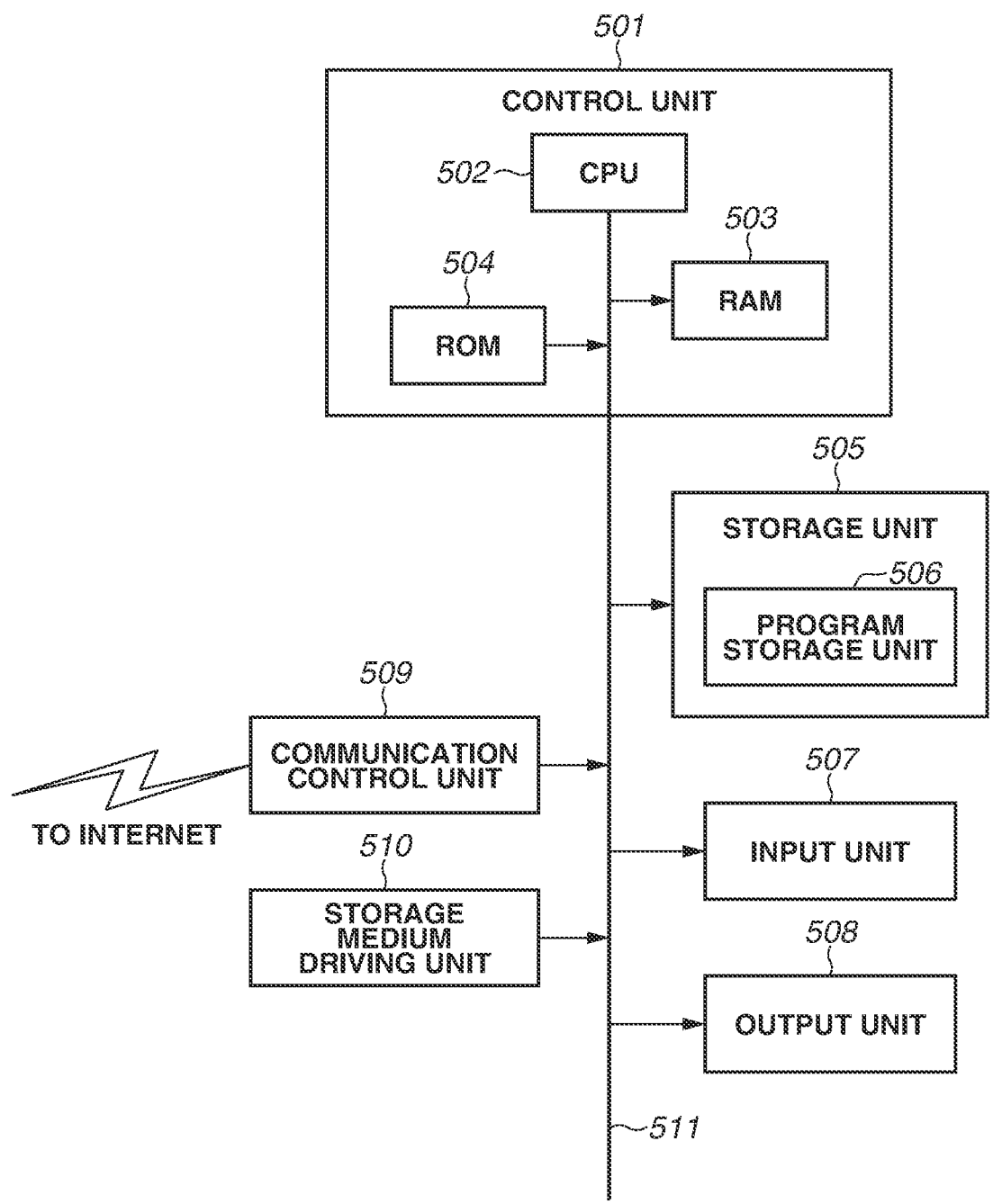
FIG. 5 is a diagram illustrating an example of a hardware like configuration of the instruction operation cloud service.

FIG. 5 is a diagram illustrating an example of the configuration of the instruction operation cloud service 402. The instruction operation cloud service 402 is configured by a storage unit 505, an input unit 507, an output unit 508, a communication control unit 509, and a storage medium driving unit 510 connecting to a control unit 501 via a bus line 511.

The control unit 501 includes a CPU 502, a ROM 504, and a RAM 503.

According to a predetermined program, the CPU 502 performs various processes, such as calculation processing and information processing, and controls the entirety of a bundle pool server.

The ROM 504 is a read-only storage device and stores a basic program, data, and a parameter for causing the instruction operation cloud service 402 to operate.

The RAM 503 is a randomly accessible storage device, and for example, provides a working area for the CPU 502 to manage a bundle.

The storage unit 505 is, for example, a readable and writable storage medium composed of a large-capacity hard disk. In the storage unit 505, a program storage unit 506 is provided.

The program storage unit 506 stores an OS and other programs.

The input unit 507 includes an input device, such as a keyboard and a mouse.

The output unit 508 includes an output device, such as a display device and a printing device.

The storage medium driving unit 510 is a driving device that drives an attachable and detachable storage medium to read and write data from and to the storage medium.

The communication control unit 509 is a function unit that communicates with the image forming apparatus 130, other terminals, and a server apparatus via the Internet.

Figure 6:
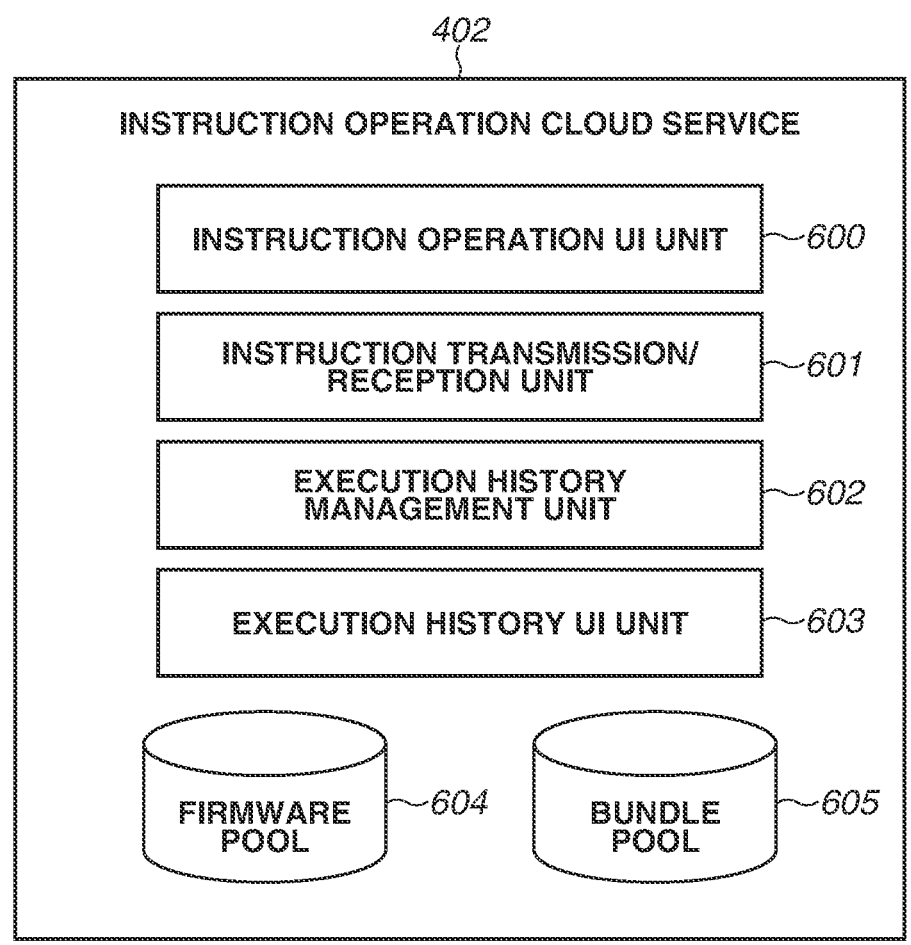
FIG. 6 is a block diagram illustrating a module configuration of the instruction operation cloud service.

FIG. 6 is a block diagram illustrating the module configuration of the instruction operation cloud service 402.

An instruction operation UI unit 600 is a UI that specifies a written instruction to be transmitted to the image forming apparatus 130.

An instruction transmission/reception unit 601 is a module that transmits the written instruction specified by the instruction operation UI unit 600 to the image forming apparatus 130. The instruction transmission/reception unit 601 also receives the result of the written instruction executed by the image forming apparatus 130.

An execution history management unit 602 is a module that stores and manages the executed written instruction.

An execution history UI unit 603 displays information regarding the written instruction managed by the execution history management unit 602 on a UI. This UI will be specifically described below with reference to FIG. 11. A firmware pool 604 saves a set of pieces of firmware applicable to the image forming apparatus 130. The firmware pool 604 also has the function of transmitting the content of the firmware 250 to the image forming apparatus 130 according to a request from the image forming apparatus 130 made by inputting a firmware version.

A bundle pool 605 saves the content of a bundle that can be installed on the image forming apparatus 130. The bundle pool 605 also has the function of transmitting the content of the bundle to the image forming apparatus 130 according to a request from the image forming apparatus 130 made by inputting a bundle ID and a version.

FIG. 7 is a command correspondence table of a written instruction 700 and a written cancellation instruction 701. The correspondence of commands is illustrated with specific examples.

In FIG. 7, the left half of the correspondence illustrates a command 711 in the written instruction 700 and a parameter 712 of the command 711. In contrast, the right half of the correspondence illustrates a cancellation command 713 in the written cancellation instruction 701, a parameter 714 of the cancellation command 713, and cancellation data 715 required to execute the cancellation command 713. These items will be described below with respect to each command.

A command 721 indicated by No 720 is "FirmwareDownload" (the command 711) and is a command to give an instruction to download firmware. The parameter 712 corresponding to the command 721 is a version that specifies the firmware 250 to be downloaded, and a download number. The cancellation command 713 corresponding to the command 721 is a "DownloadDelete" command and is a command to give an instruction to delete a downloaded file. The parameter 714 corresponding to the command 721 is the file path of the downloaded firmware file. The file path is used to identify the storage location of the downloaded firmware, and the identified firmware is deleted with the "DownloadDelete" command. The data 715 corresponding to the command 721 to be used to execute the "DownloadDelete" command does not exist.

As a specific example, an example is illustrated where a firmware version 2.0 is downloaded to a predetermined folder. In this case, a 'FirmwareDownload version="2.0"' command is specified as the execution command. In contrast, the path of the folder to which the firmware version 2.0 is downloaded is stored as the parameter 714 of a "DownloadDelete" cancellation command at this time. The cancellation of this command is executed by deleting the firmware file specified by this path.

A command 722 indicated by No 720 is "FirmwareUpdate" (the command 711) and is a command to give an instruction to update firmware. As the parameter 712 corresponding to the command 722, the download number of firmware downloaded with "FirmwareDownload" (the command 711) is specified. That is, the firmware is updated using the firmware downloaded with "FirmwareDownload".

The cancellation command 713 corresponding to the command 722 is "FirmwareDownload" and "FirmwareUpdate". That is, the cancellation command 713 is composed of a plurality of commands to give an instruction to download the original firmware to change the firmware back to the original firmware, and further give an instruction to update the firmware.

The parameter 714 of "FirmwareDownload" is the firmware version before the written instruction 700 is executed, and a download number. The cancellation data 715 is unnecessary.

As the parameter 714 of "FirmwareUpdate", the download number of the firmware downloaded with "FirmwareDownload" (the command 713) is specified. The cancellation data 715 is unnecessary. As a specific example, an example is illustrated where a firmware version 1.0 is updated to a version 2.0. In this case, a "FirmwareUpdate" command is specified as the execution command, and a download number assigned with "FirmwareDownload" is specified. Thus, firmware is updated using a version 2.0 of firmware downloaded with this download number. In contrast, the original firmware version 1.0 is stored as the parameter 714 of "FirmwareDownload" as the parameter 714 of the cancellation command 713 at this time. Further, a download number is assigned as another parameter, and the assigned download number is stored as the parameter 714 of "FirmwareUpdate". The cancellation of this command is executed by downloading the version 1.0 of the firmware with "FirmwareDownload" and further updating the downloaded firmware with the "FirmwareUpdate" command.

A command 723 indicated by No 720 is "BundleDownload" (the command 711) and is a command to give an instruction to download a bundle. The parameter 712 corresponding to the command 723 is a bundle ID and a bundle version that specify a bundle to be downloaded, and a download number.

The cancellation command 713 corresponding to the command 723 is "DownloadDelete" and is a command to give an instruction to delete a downloaded file. The parameter 714 corresponding to the command 723 is the file path of the downloaded bundle file. The cancellation data 715 is unnecessary.

As a specific example, an example is illustrated where a bundle version 2.0 is downloaded to a predetermined folder. In this case, a 'BundleDownload version="2.0"' command is specified as the execution command. As the parameter 714 of a "DownloadDelete" cancellation command at this time, the path of the folder to which the bundle version 2.0 is downloaded is stored. The cancellation of this command is executed by deleting the bundle file specified by this path.

A command 724 indicated by No 720 is "BundleInstall" (the command 711) and is a command to give an instruction to newly install a bundle. As the parameter 712, the download number of a bundle downloaded with "BundleDownload" (the command 711) and license information required to install the bundle are specified. That is, a bundle is newly installed using a bundle downloaded with "BundleDownload".

The cancellation command 713 corresponding to the command 724 is "BundleUninstall" and is a command to give an instruction to uninstall an installed bundle. The parameter 714 is the bundle ID of the bundle installed with "BundleInstall".

The cancellation data 715 corresponding to the command 724 is unnecessary.

As a specific example, an example is illustrated where a bundle version 1.0 is newly installed. In this case, a "BundleInstall" command is specified as the execution command, and a download number assigned with "BundleDownload" is specified. Thus, a version 1.0 of a bundle downloaded with this download number is installed. In contrast, the bundle ID of the installed target bundle is stored as the parameter 714 of "BundleUninstall" as the parameter 714 of the cancellation command 713 at this time. The cancellation of this command is executed by uninstalling the bundle specified by the bundle ID.

A command 725 indicated by No 720 is "BundleUpdate" (the command 711) and is a command to give an instruction to install an update of a bundle. As the parameter 712 corresponding to the command 725, the download number of a bundle downloaded with "BundleDownload" (the command 711) and license information required to install the bundle are specified. That is, an update installation of a bundle is performed using a bundle downloaded with "BundleDownload".

The cancellation command 713 corresponding to the command 725 is "BundleDownload" and "BundleUpdate". That is, the cancellation command 713 is composed of a plurality of commands to give an instruction to download the original bundle to change the bundle back to the original bundle version, and further give an instruction to install an update of the bundle.

The parameter 714 of "BundleDownload" is the bundle version before the written instruction 700 is executed, and a download number. Further, a backup license file required to install this bundle again is acquired as the cancellation data 715. This backup license file needs to be acquired for information regarding the remaining use period of the bundle when the bundle is updated. Although the present example embodiment illustrates an example embodiment in which real data on the backup license file is managed by the table in FIG. 7, information for identifying the backup license file managed separately from the table in FIG. 7, such as the file path of or identification information regarding the backup license file, may be managed by the table in FIG. 7.

As the parameter 714 of "BundleUpdate", the download number of the bundle downloaded with "BundleDownload" (the command 713) and the path of the backup license file are specified. The cancellation data 715 is unnecessary. That is, an update installation of the original bundle is performed using the bundle downloaded with "BundleDownload" and the backup license.

As a specific example, an example is illustrated where a bundle version 1.0 is updated to a version 2.0. In this case, a "BundleUpdate" command is specified as the execution command, and a download number assigned with "BundleDownload" is specified. Thus, a bundle downloaded with this download number is installed. In contrast, the bundle ID of the updated bundle and the original bundle version 1.0 are stored as the parameters 714 of "BundleDownload" as the parameter 714 of the cancellation command 713 at this time.

Further, a download number is assigned as another parameter, and the assigned download number is stored as the parameter 714 of "BundleUpdate". The backup license at this time is also saved.

The cancellation of this command is executed by downloading the version 1.0 of the bundle with "BundleDownload" and further updating the downloaded bundle with the "BundleUpdate" command using the backup license file specified by the backup license path.

A command 726 indicated by No 720 is "BundleStart" (the command 711) and is a command to give an instruction to start a bundle. The parameter 712 corresponding to the command 726 is a bundle ID that specifies a bundle to be started. The cancellation command 713 corresponding to the command 726 is "BundleStop" and is a command to give an instruction to stop a bundle. The parameter 714 corresponding to the command 726 is the bundle ID of the started bundle. The cancellation data 715 is unnecessary.

As a specific example, an example is illustrated where a "bundle ID=1234567" bundle is started. In this case, as the execution command, a 'BundleStart appid="1234567"' command is specified. In contrast, the bundle ID of the started bundle is stored as the parameter 714 of a "BundleStop" cancellation command at this time. The cancellation of this command is executed by stopping the "bundle ID=1234567" bundle specified by this bundle ID.

A command 727 indicated by No 720 is "BundleStop" (the command 711) and is a command to give an instruction to stop a bundle. The parameter 712 corresponding to the command 727 is a bundle ID that specifies a bundle to be stopped. The cancellation command 713 corresponding to the command 727 is "BundleStart" and is a command to give an instruction to start a bundle. The parameter 714 corresponding to the command 727 is the bundle ID of the stopped bundle. The cancellation data 715 is unnecessary.

As a specific example, an example is illustrated where a "bundle ID=1234567" bundle is stopped. In this case, as the execution command, a 'BundleStop appid="1234567"' command is specified. In contrast, the bundle ID of the stopped bundle is stored as the parameter 714 of a "BundleStart" cancellation command at this time. The cancellation of this command is executed by starting the "bundle ID=1234567" bundle specified by this bundle ID.

A command 728 indicated by No 720 is "BundleUninstall" (the command 711) and is a command to give an instruction to uninstall a bundle. The parameter 712 corresponding to the command 728 is a bundle ID that specifies a bundle to be uninstalled.

The cancellation command 713 corresponding to the command 728 is "BundleDownload" and "BundleInstall". That is, the cancellation command 713 is composed of a plurality of commands to give an instruction to download the original bundle to install the original bundle version of the bundle again, and further give an instruction to newly install the bundle.

The parameter 714 of "BundleDownload" has the bundle version before the written instruction 700 is executed, and a download number. Further, a backup license file required to install this bundle again is acquired as the cancellation data 715. This backup license file needs to be acquired for information regarding the remaining use period of the bundle when the bundle is uninstalled.

As the parameter 714 of "BundleInstall", the download number of the bundle downloaded with "BundleDownload" (the command 713) and the path of the backup license file are specified. The cancellation data 715 is unnecessary. That is, the original bundle is newly installed using the bundle downloaded with "BundleDownload" and the backup license.

As a specific example, an example is illustrated where a bundle version 1.0 of a bundle is uninstalled with "bundle ID=1234567". In this case, a 'BundleUninstall appid="1234567"' command is specified as the execution command. In contrast, the bundle ID of the original bundle and the bundle version of the uninstalled bundle are stored as the parameters 714 of "BundleDownload", as the parameter 714 of the cancellation command 713 at this time.

Further, a download number is assigned as another parameter, and the assigned download number is stored as the parameter 714 of "BundleInstall". Further, the backup license at this time is saved. The cancellation of this command is executed by downloading the version 1.0 of the bundle with "BundleDownload", and further installing the downloaded bundle with the "BundleInstall" command using the backup license file specified by the backup license path.

A command 729 indicated by No 720 is "DeviceReboot" (the command 711) and is a command to restart the image forming apparatus 130. The parameter 712 is unnecessary.

The cancellation command 713 corresponding to the command 729 does not exist.

As a specific example, an example is illustrated where the image forming apparatus 130 is updated. In this case, the execution command is a "DeviceReboot" command. In contrast, the cancellation command 713 is not generated in the first place.

Figure 8:
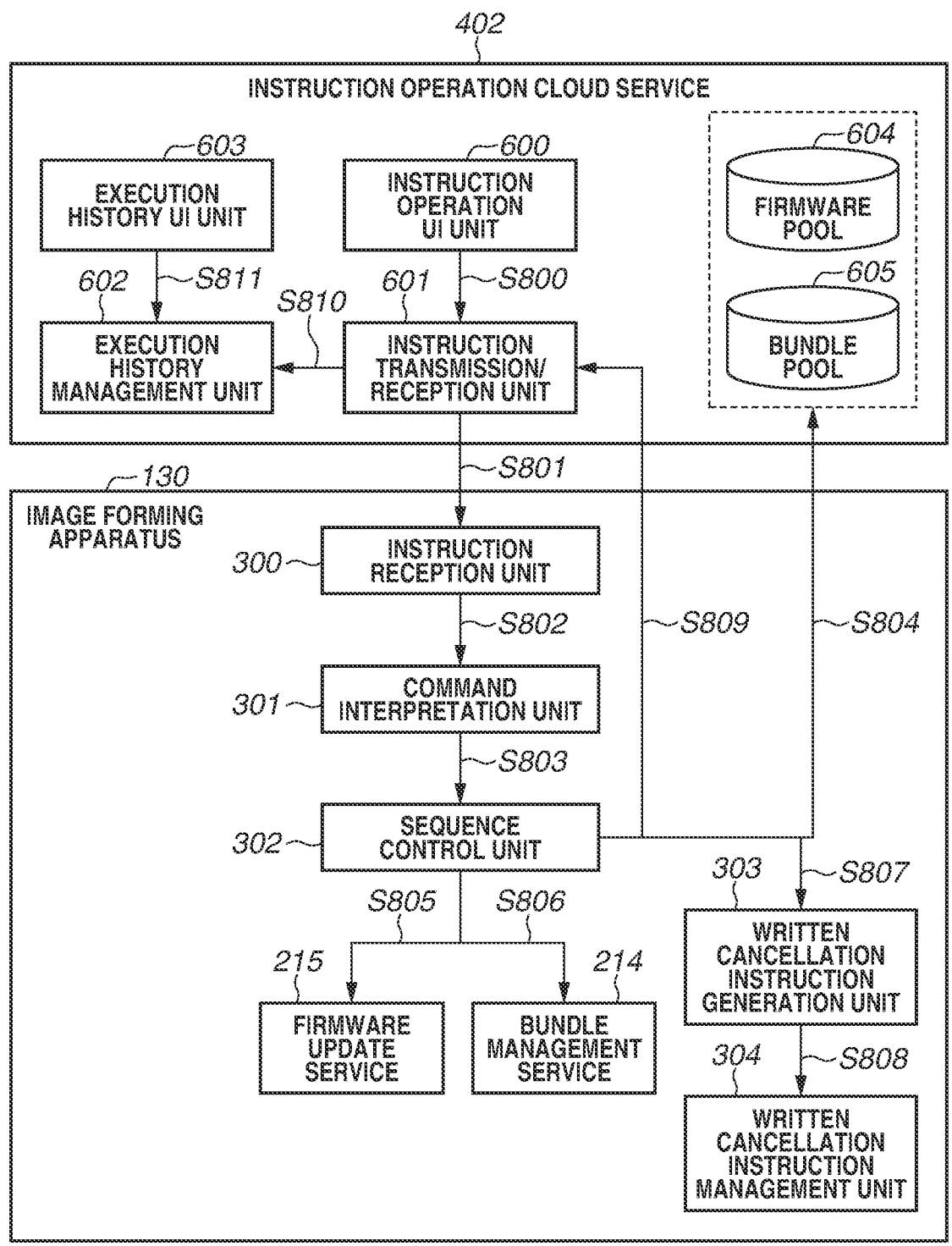
FIG. 8 is a block diagram illustrating a flow of a written instruction from the instruction operation cloud service to the image forming apparatus.

FIG. 8 is a block diagram illustrating the processing flow of a written instruction from the instruction operation cloud service 402 to the image forming apparatus 130.

In step S800, the instruction operation UI unit 600 requests the instruction transmission/reception unit 601 to transmit a written instruction specified through the instruction operation UI unit 600 by the user. In step S801, the instruction transmission/reception unit 601 transmits the written instruction to the instruction reception unit 300 of the image forming apparatus 130. In this case, a form is employed in which the instruction operation cloud service 402 transmits the written instruction to the image forming apparatus 130. However, there is also an environment where it is difficult for an external cloud service to directly instruct the image forming apparatus 130 due to the setting of a firewall. In this case, a form may be employed in which the instruction transmission/reception unit 601 periodically checks the presence of a written instruction with the instruction operation cloud service 402, and if a written instruction is present, downloads and receives the written instruction.

In step S802, the instruction reception unit 300 that has received the written instruction requests the command interpretation unit 301 to interpret commands in the written instruction. In step S803, the command interpretation unit 301 that has received the written instruction generates command objects and passes the command objects to the sequence control unit 302. Each command in the written instruction is executed according to a written instruction execution time described in the written instruction. If immediate execution is specified, the command is immediately executed. If not, a timer is set for the written instruction execution time, and the command is executed when the time specified in the timer arrives.

Although the behavior varies depending on the commands described in the written instruction, a description is given below of an example where firmware and a bundle are downloaded, the firmware is updated, and the bundle is installed.

In step S804, if a firmware download command 721 is specified in the written instruction, the sequence control unit 302 acquires firmware corresponding to the version specified in the command 721 from the firmware pool 604 and downloads the firmware to a particular storage location in the HDD 104. If a bundle download command 723 is specified in the written instruction, the sequence control unit 302 acquires a bundle corresponding to the bundle ID and the version specified in the command 723 from the bundle pool 605 and downloads the bundle to a particular storage location in the HDD 104.

In step S805, if a firmware update command 722 is specified in the written instruction, the sequence control unit 302 passes the firmware downloaded in step S804 to the firmware update service 215 and updates the firmware.

In step S806, if the bundle installation command 724 is specified in the written instruction, the sequence control unit 302 passes the bundle downloaded in step S804 to the bundle management service 214 and installs the bundle. In steps S805 and S806, the sequence control unit 302 stores the parameter of the cancellation command and also generates the cancellation data where necessary every time each command is executed.

In step S807, after executing all the cancellation commands, the sequence control unit 302 requests the written cancellation instruction generation unit 303 to generate a written cancellation instruction (FIG. 7). In step S808, the written cancellation instruction generation unit 303 generates the written cancellation instruction and registers the written cancellation instruction in a written cancellation instruction management list in the written cancellation instruction management unit 304.

In step S809, after executing all the commands in the written instruction, the sequence control unit 302 transmits the execution results of the commands to the instruction transmission/reception unit 601 of the instruction operation cloud service 402. In step S810, the instruction transmission/reception unit 601 registers the received execution results in the execution history management unit 602. The registered execution results are used when the execution history UI unit 603 displays execution history in step S811. This is the description of FIG. 8.

Figure 9:
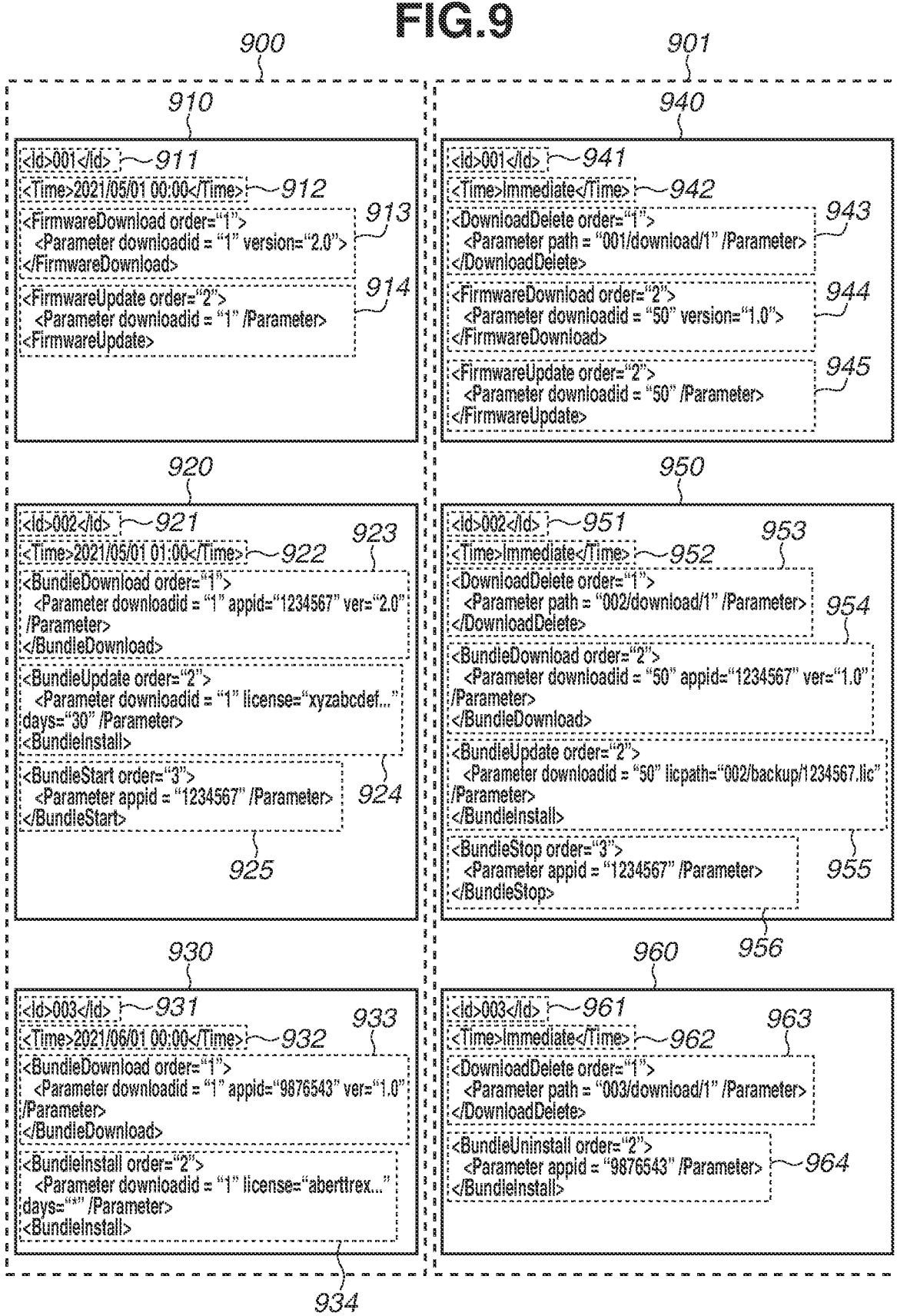
FIG. 9 is a diagram illustrating specific examples of a written instruction and a written cancellation instruction.

FIG. 9 is a diagram illustrating specific examples of a written instruction and a written cancellation instruction. FIG. 9 illustrates a written cancellation instruction 901 with respect to a written instruction 900. First, the written instruction 900 is described.

In a written instruction 910, an ID 911 indicates a written instruction number, and each written instruction is assigned a unique number. A time 912 is a written instruction execution time and indicates a scheduled time when the written instruction 910 is executed. A command 913 is a "FirmwareDownload" command indicating an instruction to download firmware. "Order" indicated in the command 913 is a command number and the execution order of the command 913. "Order" is assigned to each command in order from 1. In the command 913, a download number "1" and a firmware version "2.0" to be downloaded are also specified.

A command 914 is a "FirmwareUpdate" command indicating an instruction to update firmware. In the command 914, the download number "1" is specified to apply the firmware downloaded with the command 913.

Regarding a written instruction 920, an ID 921 is a written instruction number, and "002" is specified. A time 922 is a written instruction execution time and indicates a scheduled time when the written instruction 920 is executed.

A command 923 is a "BundleDownload" command indicating an instruction to download a bundle. In the command 923, a download number "1", a bundle ID "1234567", and a bundle version "2.0" are specified.

A command 924 is a "BundleUpdate" command indicating an instruction to install an update of a bundle. In the command 924, to apply the bundle downloaded with "BundleDownload" as the command 923, the download number "1" is specified. License information 'license="xyzabcdef . . ."' required to install the bundle is also specified.

A command 925 is a "BundleStart" command indicating an instruction to start a bundle.

In the command 925, to start the bundle installed with the command 924, the bundle ID "1234567" is specified.

Finally, a written instruction 930 is described. An ID 931 is a written instruction number, and "003" is specified. A time 932 is a written instruction execution time and indicates a scheduled time when the written instruction 930 is executed. A command 933 is a "BundleDownload" command indicating an instruction to download a bundle. In the command 933, a download number "1", a bundle ID "9876543", and a bundle version "1.0" are specified.

A command 934 is a "BundleInstall" command indicating an instruction to newly install a bundle. In the command 934, to apply the bundle downloaded with the command 933, the download number "1" is specified. License information 'license="aberttrex . . ."' required to install the bundle is also specified.

The written instruction 900 (the written instruction 910, 920, or 930) may be manually created, or the instruction operation cloud service 402 may present a written instruction creation UI (not illustrated) to a person who gives an instruction, and the system may automatically create a written instruction based on an instruction given via the UI. Alternatively, a method is also possible in which the system creates a written instruction in conjunction with a contract with the user. For example, a method is possible in which the system creates a written instruction to install the bundle according to the determination of the purchase of a bundle by the user.

The written cancellation instruction 901 will now be described. First, a written cancellation instruction 940 will be described.

The written cancellation instruction 940 is a written cancellation instruction corresponding to the written instruction 910. An ID 941 indicates a written cancellation instruction number and is assigned the same number as the written instruction number of a written instruction with which the written cancellation instruction 940 is associated. Since the written cancellation instruction 940 corresponds to the written instruction 910, the ID 941 is assigned "001", which is the same ID as that of the written instruction 910.

A time 942 is a written cancellation instruction execution time, and "Immediate" for immediately executing the written cancellation instruction 940 if an execution instruction is received is specified.

A command 943 is a cancellation command corresponding to "FirmwareDownload" as the command 913. In this case, the command 943 is a "DownloadDelete" command indicating a command instruction to give an instruction to delete a downloaded file, according to the correspondence table illustrated in FIG. 7. "Order" is specified by a command number and assigned the same number as that of an instruction command with which the command 943 is associated. The command 943 is a cancellation command associated with the command 913 having a command number "1" and is therefore assigned the same command number "1". A parameter is the file path of the downloaded firmware file.

Commands 944 and 945 are cancellation commands corresponding to "FirmwareUpdate" as the command 914. The command 944 is a "FirmwareDownload" command indicating an instruction to download firmware. In the command 944, a download number "50" is specified, and "1.0", which is the version before the firmware is applied, is specified as a firmware version.

The command 944 is a cancellation command associated with the command 914 having a command number "2" and is therefore assigned the same command number "2" as a command number.

The command 945 is a "FirmwareUpdate" command indicating an instruction to update firmware. In the command 945, the download number "50" is specified to apply the firmware downloaded with "FirmwareDownload" having the command number "2". The command 945 is a cancellation command associated with the command 914 having the command number "2" and is therefore assigned the same command number "2" as a command number.

As is clear from the comparison between the written instructions 910 and 940, the written instruction 910 gives an instruction to install the version 2.0 of the firmware, whereas the written instruction 940 gives an instruction to delete the downloaded version 2.0 of the firmware and download the version 1.0 of the firmware.

Next, a written cancellation instruction 950 will be described. The written cancellation instruction 950 is a written cancellation instruction corresponding to the written instruction 920. Since the written cancellation instruction 950 corresponds to the written instruction 920, an ID 951 is assigned "002", which is the same ID as that of the written instruction 920.

A time 952 is a written cancellation instruction execution time, and "Immediate" is specified for immediately executing the written cancellation instruction 950 if an execution instruction is received. A command 953 is a cancellation command corresponding to "BundleDownload" as the command 923. In this case, the command 953 is a "DownloadDelete" command indicating a command instruction to give an instruction to delete a downloaded file, according to the correspondence table illustrated in FIG. 7. The command 953 is a cancellation command associated with the command 923 having a command number "1" and is therefore assigned the same command number "1" to specify "order". A parameter is the file path of the downloaded bundle file.

Commands 954 and 955 are cancellation commands corresponding to "BundleUpdate" as the command 924. The command 954 is a "BundleDownload" command indicating an instruction to download a bundle. In the command 954, a download number "50", the bundle ID "1234567", and a bundle version "1.0", which is the version before an update of the bundle is installed, are specified. The command 954 is a cancellation command associated with the command 924 having a command number "2" and is therefore assigned the same command number "2" as a command number.

The command 955 is a "BundleUpdate" command indicating an instruction to update a bundle. In the command 955, the download number "50" is specified to apply the bundle downloaded with "BundleDownload" having the command number "2". In the command 955, the path of a generated backup license file is also specified. The command 955 is a cancellation command associated with the command 924 having the command number "2" and is therefore assigned the same command number "2" as a command number.

A command 956 is a cancellation command corresponding to "BundleStart" as the command 925. In this case, the command 956 is a "BundleStop" command indicating a command instruction to give an instruction to stop a bundle, according to the correspondence table illustrated in FIG. 7. In the command 956, the bundle ID "1234567" is specified to stop the bundle specified by "BundleStart" having a command number "3". The command 956 is a cancellation command associated with the command 925 having the command number "3" and is therefore assigned the same command number "3" as a command number.

As is clear from the comparison between the written instructions 920 and 950, the written instruction 920 gives an instruction to install the version 2.0 of the bundle, whereas the written instruction 950 gives an instruction to delete (or stop) the version 2.0 of the bundle and install the version 1.0 of the bundle.

Finally, a written cancellation instruction 960 will be described. The written cancellation instruction 960 is a written cancellation instruction corresponding to the written instruction 930. Since the written cancellation instruction 960 corresponds to the written instruction 930, an ID 961 is assigned "003", which is the same ID as that of the written instruction 930.

A time 962 is a written cancellation instruction execution time, and "Immediate" is specified for immediately executing the written cancellation instruction 960 if an execution instruction is given.

A command 963 is a cancellation command corresponding to "BundleDownload" as the command 933. In this case, the command 963 is a "DownloadDelete" command indicating a command instruction to give an instruction to delete a downloaded file, according to the correspondence table illustrated in FIG. 7. The command 963 is a cancellation command associated with the command 933 having a command number "1" and is therefore assigned the same command number "1" to specify "order". A parameter is the file path of the downloaded bundle file.

A command 964 is a "BundleUninstall" command indicating an instruction to uninstall a bundle. To uninstall the bundle specified with "BundleInstall" having a command number "2", the bundle ID "9876543" is specified. The command 964 is a cancellation command associated with the command 934 having the command number "2" and is therefore assigned the same command number "2" as a command number.

As is clear from the comparison between the written instructions 930 and 960, the written instruction 930 gives an instruction to install the version 1.0 of the bundle, whereas the written instruction 960 gives an instruction to uninstall the version 1.0 of the bundle.

The format of the written instructions exemplified in FIG. 9 is the Extensible Markup Language (XML) format, but is not limited to this format.

FIG. 10A is a diagram illustrating a written cancellation instruction management table managed by the written cancellation instruction management unit 304.

A written instruction number 1001 is a written instruction number described in the written instruction 900. A written instruction execution date and time 1002 indicates the date and time when the written instruction 900 is actually executed. A written cancellation instruction 1003 indicates information regarding a written cancellation instruction generated by the written cancellation instruction generation unit 303.

Written instructions 1011, 1012, and 1013 indicated by No (1010) are equivalent to the written instructions 910, 920, and 930, respectively. Written cancellation instructions 1, 2, and 3 indicated by the written cancellation instruction 1003 are equivalent to the written cancellation instructions 940, 950, and 960, respectively.

The written cancellation instruction management unit 304 can identify and return a written cancellation instruction corresponding to the specified written instruction number 1001 using the written cancellation instruction management table.

FIG. 10B is a diagram illustrating an execution history management table managed by the execution history management unit 602.

A written instruction number 1021 is a written instruction number described in the written instruction 900. A command number 1022 is a number for identifying a command assigned in order of commands in the written instruction 900. A written instruction execution date and time 1023 indicates the date and time when the written instruction 900 is executed. A command 1024 indicates the executed command. An execution result 1025 indicates the execution result indicating the success or failure of the command.

Results 1031 and 1032 indicated by No 1030 indicate the results of the written instruction 910. That is, the command 1024 corresponding to the result 1031 is equivalent to "FirmwareDownload" having the command number 1 indicated by the command 913. The command 1024 corresponding to the result 1032 is equivalent to "FirmwareUpdate" having the command number "2" indicated by the command 914.

Similarly, results 1033, 1034, and 1035 indicated by No 1030 indicate the results of the written instruction 920. That is, the command 1024 corresponding to the result 1033 is equivalent to "BundleDownload" having the command number 1 indicated by the command 923. The command 1024 corresponding to the result 1034 is equivalent to "BundleUpdate" having the command number "2" indicated by the command 924. The command 1024 corresponding to the result 1035 is equivalent to "BundleStart" having the command number 3 indicated by the command 925.

Results 1036 and 1037 indicated by No 1030 indicate the results of the written instruction 930. That is, the command 1024 corresponding to the result 1036 is equivalent to "BundleDownload" having the command number 1 indicated by the command 933. The command 1024 corresponding to the result 1037 is equivalent to "BundleInstall" having the command number "2" indicated by the command 934.

Figure 11:
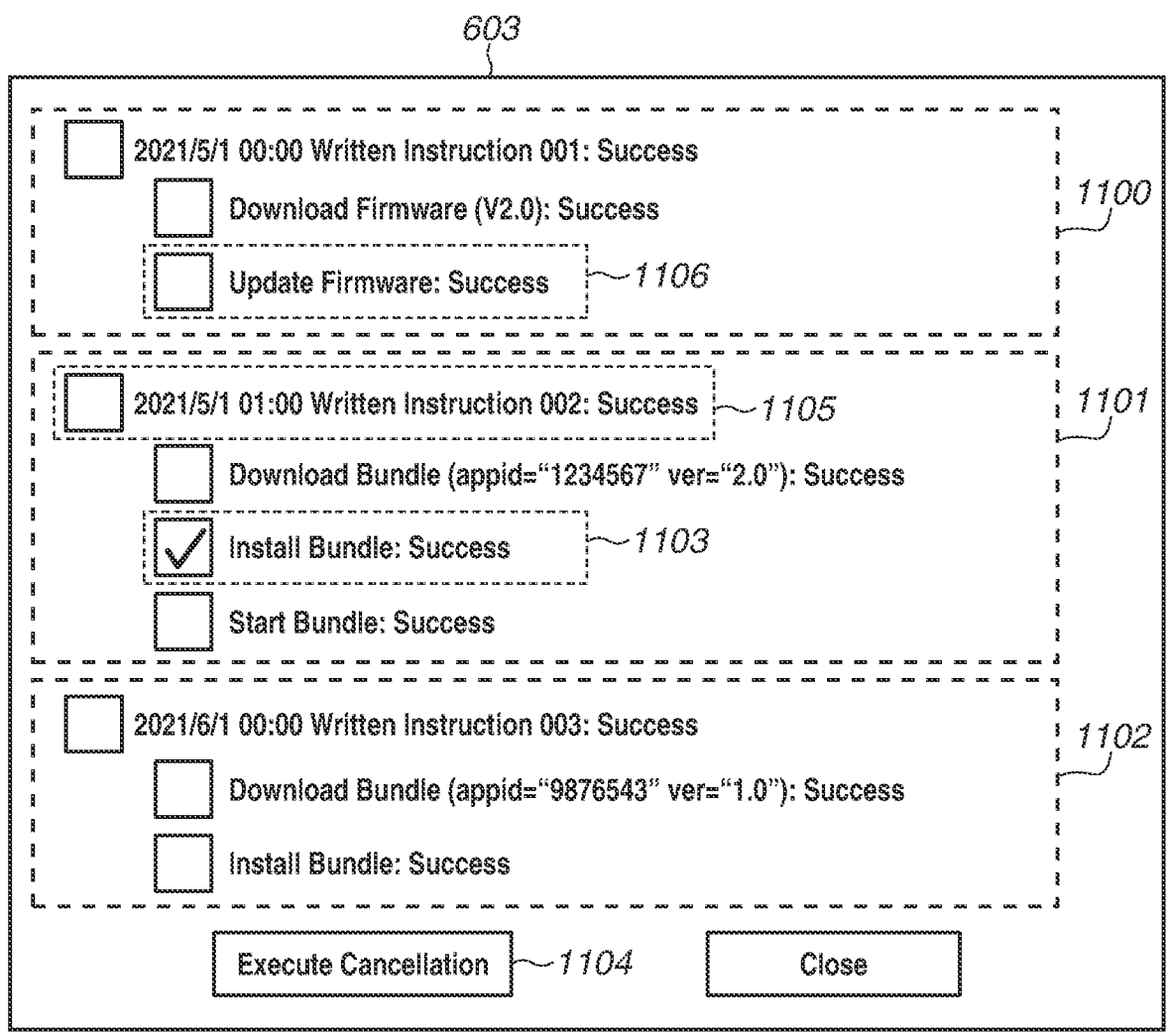
FIG. 11 is a diagram illustrating an execution history user interface (UI) in an execution history UI unit.

FIG. 11 is a diagram illustrating an execution history UI in the execution history UI unit 603.

A UI portion 1100 indicates the result of the written instruction 910 managed by the execution history management unit 602. A UI portion 1101 indicates the result of the written instruction 920 managed by the execution history management unit 602. A UI portion 1102 indicates the result of the written instruction 930 managed by the execution history management unit 602.

The screen 603 displays checkboxes for selecting executed commands together with the execution results. For example, if a checkbox 1103 indicating "bundle installation: success" is checked by a user operation and "execute cancellation" 1104 is selected, the command number "2" of the written instruction number "002" is identified as a cancellation target and cancelled.

If a checkbox 1105 indicating "written instruction 002: success" is checked and the "execute cancellation" 1104 is pressed, all the command numbers "1", "2", and "3" of the written instruction number "002" are cancelled. The cancellation of a plurality of written instructions cannot be specified at a time.

In a case where the execution itself of a written instruction is suspended or fails for some reason, the written instruction is not displayed on the screen 603. In a case where the execution of a written instruction is successful, a command capable of receiving an instruction to cancel the written instruction is displayed on the screen 603.

Figure 12:
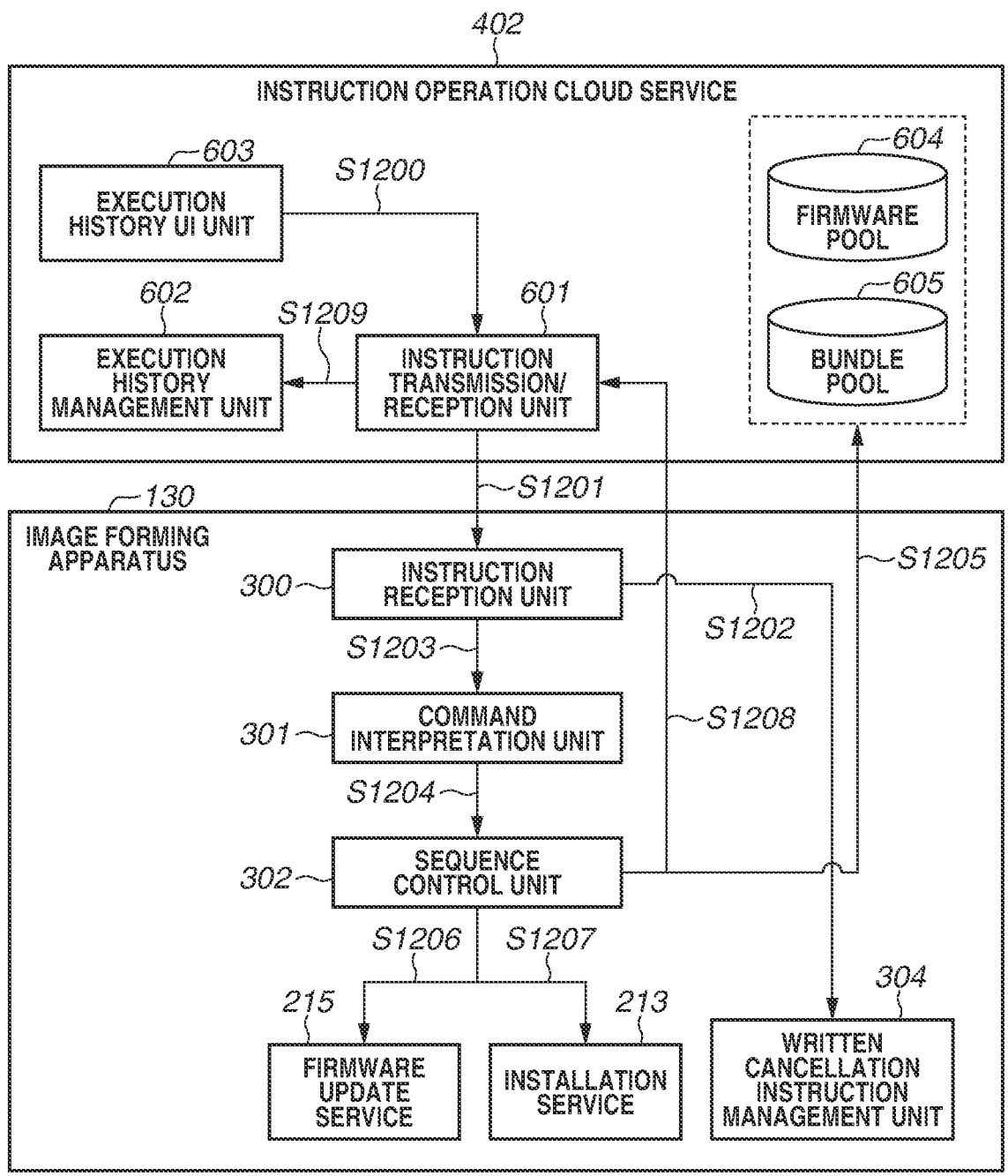
FIG. 12 is a block diagram illustrating a flow of a written cancellation instruction from the instruction operation cloud service to the image forming apparatus.

FIG. 12 is a block diagram illustrating the processing flow of a written cancellation instruction from the instruction operation cloud service 402 to the image forming apparatus 130.

In step S1200, the execution history UI unit 603 requests the instruction transmission/reception unit 601 to perform a cancellation process specified through the execution history UI unit 603 by the user. Information (cancellation information) received by the instruction transmission/reception unit 601 at this time includes a written instruction number and a command number corresponding to a written instruction specified as a written instruction to be cancelled and a command, respectively. A method for representing the cancellation information in a written instruction format and treating the cancellation information similarly to a normal written instruction may be employed.

In step S1201, the instruction transmission/reception unit 601 transmits the cancellation information to the instruction reception unit 300 of the image forming apparatus 130. Although a form is employed in which the instruction operation cloud service 402 transmits the cancellation information to the image forming apparatus 130, there is also an environment where it is difficult for an external cloud service to directly instruct the image forming apparatus 130 due to the setting of a firewall. In this case, a form may be employed in which the instruction transmission/reception unit 601 periodically checks the presence of cancellation information with the instruction operation cloud service 402, and acquires and receives the cancellation information if cancellation information is present.

In step S1202, the instruction reception unit 300 having received the cancellation information passes a written instruction number included in the cancellation information to the written cancellation instruction management unit 304 and acquires the written cancellation instruction 901 associated with the written instruction number. The instruction reception unit 300 having received the written cancellation instruction 901 then requests the command interpretation unit 301 to interpret commands in the written cancellation instruction 901.

In step S1203, the command interpretation unit 301 having received the written cancellation instruction 901 generates command objects and passes the command objects to the sequence control unit 302. Each command in the written cancellation instruction 901 is executed according to a written instruction execution time described in the written instruction. If immediate execution is specified, the command is immediately executed. If not, a timer is set for the written instruction execution time, and the command is executed when the time specified in the timer arrives.

The behavior varies depending on the cancellation instruction. The following three cases will be described.
<Case 1: a case where the installation of the bundle corresponding to the command number "2" of the written instruction number "002" illustrated in FIG. 11 is cancelled (1103)>

The written cancellation instruction 901 acquired by the sequence control unit 302 is indicated by the written cancellation instruction 950 associated with the written instruction number "002". The commands 954 and 955 corresponding to the command number "2" in the written cancellation instruction 950 are then executed.

First, the command 954 is executed. In step S1205, the sequence control unit 302 acquires a bundle corresponding to the bundle ID and the version specified in the command 954 from the bundle pool 605 and downloads the bundle to a particular storage location in the HDD 104.

The command 955 is then executed. In step S1207, the sequence control unit 302 passes the bundle downloaded in step S1205 to the bundle management service 214 and installs the bundle.
<Case 2: a case where an instruction to cancel the written instruction number "002" illustrated in FIG. 11 is given (1105)>

The written cancellation instruction 901 acquired by the sequence control unit 302 is indicated by the written cancellation instruction 950 associated with the written instruction number "002". All the commands included in the written cancellation instruction 950 are then executed in descending order of command numbers.

First, the command 956 is executed. The sequence control unit 302 passes the specified bundle ID to the bundle management service 214 and stops a bundle.

Next, the commands 954 and 955 are executed. This is an operation similar to that illustrated in case 1, and is therefore not described here.

Finally, the downloaded file is deleted with the command 953. At this time, however, the content of the downloaded bundle is already deleted in post-processing when the downloaded bundle is installed according to the first instruction. Thus, nothing is executed as a result.
<Case 3: a case where an instruction to cancel an update of the firmware corresponding to the command number "2" of the written instruction number "001" illustrated in FIG. 11 (1106)>

The written cancellation instruction 901 acquired by the sequence control unit 302 is indicated by the written cancellation instruction 940 associated with the written instruction number "001". The commands 944 and 945 corresponding to the command number "2" in the written cancellation instruction 940 are then executed.

In a case where an update of the firmware is cancelled, then in step S1206, the sequence control unit 302 passes the original firmware downloaded in step S1205 to the firmware update service 215 and updates the firmware.

In step S1208, the sequence control unit 302 executes a command that requires the cancellation of the written cancellation instruction 901, and then transmits the execution result of the command to the instruction transmission/reception unit 601 of the instruction operation cloud service 402.

In step S1209, the instruction transmission/reception unit 601 registers the received execution result in the execution history management unit 602.

Figure 13A:
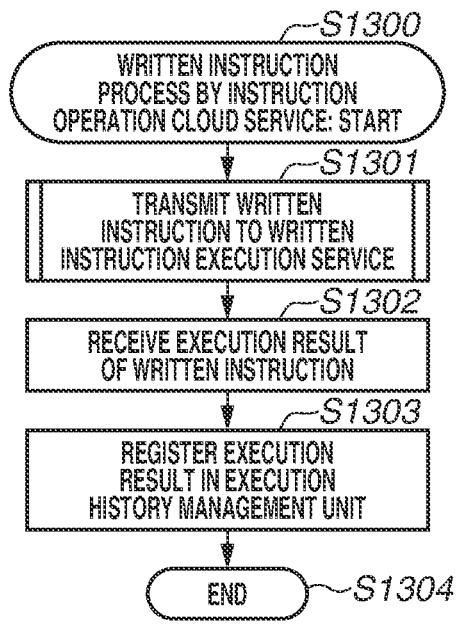
FIG. 13A is a flowchart illustrating processing in a case where the instruction operation cloud service gives an instruction to the image forming apparatus.

FIG. 13A is a flowchart illustrating processing in a case where the instruction operation cloud service 402 gives an instruction to the image forming apparatus 130.

In step S1300, the instruction operation cloud service 402 starts an instruction process. In step S1301, the instruction transmission/reception unit 601 transmits a written instruction to the written instruction execution service 216. Details of the processing of the written instruction execution service 216 will be described with reference to FIG. 13B. Although a form is employed in which the instruction operation cloud service 402 transmits the written instruction to the image forming apparatus 130, there is also an environment where it is difficult for an external cloud service to directly instruct the image forming apparatus 130 due to the setting of a firewall. In this case, a form is also possible in which the instruction operation cloud service 402 manages and holds a written instruction once and waits for the image forming apparatus 130 to acquire the written instruction.

In step S1302, the instruction transmission/reception unit 601 receives the execution result of the instruction from the written instruction execution service 216. In step S1303, the instruction transmission/reception unit 601 having received the execution result of the instruction registers the received execution result in the execution history management unit 602. In step S1304, the processing of the instruction operation cloud service 402 ends.

Figure 13B:
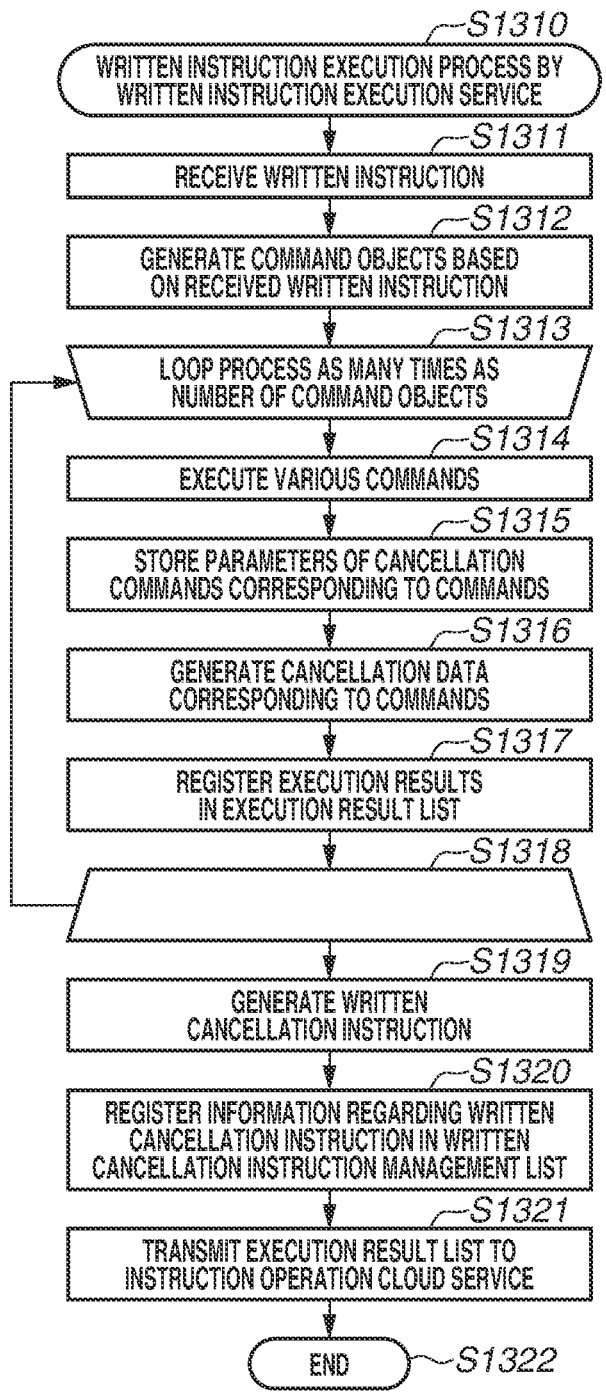
FIG. 13B is a flowchart illustrating an instruction execution process performed by the written instruction execution service.

FIG. 13B is a flowchart illustrating a written instruction execution process performed by the written instruction execution service 216. In step S1310, the written instruction execution service 216 starts a written instruction execution process.

In step S1311, the instruction reception unit 300 receives a written instruction. The following processing is started using the transmission of the written instruction from the instruction operation cloud service 402 illustrated in step S1301 as a trigger. However, a form may be employed in which the instruction reception unit 300 periodically checks the presence of a written instruction with the instruction operation cloud service 402, and downloads and receives the written instruction if a written instruction is present.

In step S1312, the command interpretation unit 301 generates command objects based on the received written instruction. In step S1313, the sequence control unit 302 starts to perform a loop process as many times as the number of the command objects generated in step S1312.

In step S1314, the sequence control unit 302 executes various commands, such as a firmware download command, a firmware update command, a bundle download command, and a bundle installation command. Specific examples of the commands are illustrated in FIG. 7, and therefore are not described here.

In step S1315, the sequence control unit 302 stores the parameters of the cancellation commands corresponding to the execution commands illustrated in FIG. 7. In step S1316, the sequence control unit 302 generates the cancellation data corresponding to the execution commands illustrated in FIG. 7.

In step S1317, the sequence control unit 302 registers the execution results of the commands in an execution result list.

In step S1318, if the sequence control unit 302 executes the loop process on all the command objects generated in step S1312, the processing proceeds to step S1319. If a command object to be processed still remains, the processing returns to step S1314 to repeat the execution of the next command.

In step S1319, the written cancellation instruction generation unit 303 identifies the cancellation commands corresponding to the execution commands using the table in FIG. 7, generates cancellation commands for the execution commands in order of execution commands using the identified cancellation commands and the parameters stored in step S1315, and generates a written cancellation instruction corresponding to the executed written instruction.

In step S1320, the written cancellation instruction management unit 304 registers the written cancellation instruction generated in step S1319 and the cancellation data generated in step S1316 in the written cancellation instruction management list in the written cancellation instruction management unit 304.

In step S1321, the sequence control unit 302 transmits the execution result list to the instruction operation cloud service 402. In step S1322, the processing of the written instruction execution service 216 ends.

FIG. 14A is a flowchart illustrating processing in a case where the instruction operation cloud service 402 gives a cancellation instruction to the image forming apparatus 130.

In step S1400, the instruction operation cloud service 402 starts a cancellation instruction process. In step S1401, the instruction operation cloud service 402 transmits cancellation information to the written instruction execution service 216. The cancellation information includes the written instruction number of a written instruction to be cancelled and the command number of a command in the written instruction. In a case where a plurality of commands is to be cancelled, a plurality of cancellation commands is specified. The details of the processing of the written instruction execution service 216 will be described with reference to FIG. 14B. Although a form is employed in which the instruction operation cloud service 402 transmits the cancellation information to the image forming apparatus 130, there may be also an environment where it is difficult for an external cloud service to directly instruct the image forming apparatus 130 due to the setting of a firewall. In this case, a form is also possible in which the instruction operation cloud service 402 manages and holds cancellation information once and waits for the image forming apparatus 130 to acquire the cancellation information.

In step S1402, the instruction transmission/reception unit 601 receives the execution result of the instruction from the written instruction execution service 216. In step S1403, the instruction transmission/reception unit 601 having received the execution result of the instruction registers the received execution result in the execution history management unit 602. In step S1404, the processing of the instruction operation cloud service 402 ends.

FIG. 14B is a flowchart illustrating a cancellation instruction execution process performed by the written instruction execution service 216.

In step S1410, the written instruction execution service 216 starts executing a cancellation process.

In step S1411, the instruction reception unit 300 receives cancellation information. Although the following processing is started using the transmission of the cancellation information from the instruction operation cloud service 402 illustrated in step S1401 as a trigger, a form may be employed in which the instruction reception unit 300 periodically checks the presence of cancellation information with the instruction operation cloud service 402, and receives the cancellation information if cancellation information is present.

In step S1412, the instruction reception unit 300 passes a written instruction number as the cancellation information to the written cancellation instruction management unit 304 and acquires the written cancellation instruction 901 associated with the written instruction number. In step S1413, if the written cancellation instruction 901 associated with the written instruction number is acquired (YES in step S1413), the processing proceeds to step S1414. If, in contrast, the written cancellation instruction 901 associated with the written instruction number is not acquired (NO in step S1413), the processing proceeds to step S1420.

In step S1414, the command interpretation unit 301 generates command objects based on the acquired written cancellation instruction 901. In step S1415, the sequence control unit 302 starts to perform a loop process as many times as the number of the generated command objects. At this time, commands are executed in descending order of command numbers.

In step S1416, the sequence control unit 302 confirms whether the current command number matches a command number included in the cancellation information. If the current command number matches the command number included in the cancellation information (YES in step S1416), the processing proceeds to step S1417. If the current command number does not match the command number included in the cancellation information (NO in step S1416), the processing proceeds to step S1419.

In step S1417, the sequence control unit 302 executes various commands, such as a firmware download command, a firmware update command, a bundle download command, and a bundle installation command.

In step S1418, the sequence control unit 302 registers the execution results of the commands in an execution result list. In step S1419, if the sequence control unit 302 executes the loop process on all the command objects generated in step S1414, the processing proceeds to step S1420. If a command object still remains, the processing returns to step S1416 to repeat the execution of the next command.

In step S1420, the sequence control unit 302 transmits the execution result list to the instruction operation cloud service 402. In step S1421, the cancellation process performed by the written instruction execution service 216 ends.

According to the method illustrated in the first example embodiment, the following effect can be obtained. That is, cancellation commands corresponding to executed commands are created in advance, whereby a person who gives an instruction merely specifies a command to be cancelled and thereby can easily cancel the specified command without memorizing a parameter or data to cancel the command.

In a second example embodiment, a description is given of a cancellation process regarding a bundle start instruction to switch login bundles, instead of the bundle start instruction for a normal bundle illustrated in the first example embodiment.

FIG. 15 is a correspondence table of a command to give a bundle start instruction and a cancellation command in the case of a login bundle.

The written instruction 700, the written cancellation instruction 701, and the command 720 are similar to those in FIG. 7, and therefore are not described. A command 1501 indicated by No 720 is "BundleStart" (the command 711) and is a command to give an instruction to start a bundle. The parameter 712 is a bundle ID that specifies a bundle to be started. This is similar to a command in the case of a normal bundle.

In the case of a login bundle, the cancellation command 713 corresponding to this command is "BundleStart" and is a command to give an instruction to start a bundle. The parameter 714 is the bundle ID of the originally started login bundle. The cancellation data 715 is unnecessary. For example, to switch a login bundle A to a login bundle B, "BundleStart" (the bundle ID of the bundle B) is specified. Consequently, the login bundle A switches to the login bundle B.

To cancel this instruction, it is necessary to switch the login bundle B to the login bundle A. Thus, the cancellation command 713 in this case is "BundleStart" (the bundle ID of the bundle A).

As described above, a case is possible where the cancellation command 713 differs depending on the type of the bundle, even if the command 726 indicated by No 720 is the same "BundleStart".

Thus, in step S1315, the table to be referenced is changed depending on the type of the bundle when the command parameters for cancellation corresponding to the commands are stored.

As described above, according to the second example embodiment, there is a case where, specifically, regarding the relationship between a command and a cancellation command, the correspondence table to be referenced is changed according to the type of the bundle. That is, in a case where a command is newly added, it is necessary to update the correspondence table.

The purpose of various embodiments of the present disclosure can be achieved also by performing the following process, for example. That is, a storage medium recording a program code of software for achieving the functions of the above example embodiments is supplied to a system or an apparatus, and a computer (or a CPU or a microprocessor unit (MPU)) of the system or the apparatus reads the program code stored in the storage medium. In this case, the program code itself read from the storage medium achieves the functions of the above example embodiments, and the program code and the storage medium storing the program code constitute an embodiment of the present disclosure.

According to various embodiments of the present disclosure, it is possible to improve the operability of cancelling an executed particular command and changing back to the state before the command is executed.

While the present disclosure has been described with reference to example embodiments, it is to be understood that the present invention is not limited to the disclosed example embodiments. The scope of the following claims is to be accorded the broadest interpretation so as to encompass all such modifications and equivalent structures and functions.

This application claims the benefit of Japanese Patent Application No. 2021-180059, filed Nov. 4, 2021, which is hereby incorporated by reference herein in its entirety.

What is claimed is:

1. An image forming apparatus that performs a setting process, the image forming apparatus comprising:
an interface, wherein the interface is able to receive, from an instruction operation service via a network, a first written instruction for performing a setting process on or configuration control of the image forming apparatus;
one or more processors; and
one or memories storing instructions that, when executed by the one or more processors, cause the image forming apparatus to perform the functions of:
an identifying unit configured to identify a second command using information included in a first command contained in the first written instruction, wherein the second command corresponds to the first command and provides a process for canceling a process executed with the first command;
a creation unit configured to, in a case where the second command has been identified and an instruction to execute the process provided by the first command is given according to the first written instruction, generate a second written instruction to execute the second command identified by the identifying unit; and
a control unit configured to, according to a user operation, execute the second written instruction generated by the creation unit.

2. The image forming apparatus according to claim 1, wherein the first command is a command to give an instruction to install a first application on the image forming apparatus, and
wherein the second command at least includes a command to give an instruction to uninstall the first application installed on the image forming apparatus.

3. The image forming apparatus according to claim 2, wherein the second command includes a command to give an instruction to install a second application to be installed on the image forming apparatus before the first application is installed.

4. The image forming apparatus according to claim 3, wherein the first application and the second application are applications different in version from each other.

5. The image forming apparatus according to claim 3, wherein the second written instruction to execute the second command includes information regarding a license of the second application.

6. The image forming apparatus according to claim 3, wherein the second written instruction to execute the second command includes identification information regarding the second application and information regarding a version of the second application.

7. The image forming apparatus according to claim 1, wherein the user operation is an operation for cancelling a process executed with the first command, and
wherein the image forming apparatus further comprises a user interface configured to receive the user operation.

8. The image forming apparatus according to claim 7, wherein the user interface is a screen configured to display a plurality of processes included in the setting process executed by the image forming apparatus, and wherein a user is able to select, through the screen, a process executed with the first command as a cancellation target.

9. A control method for controlling an image forming apparatus that performs a setting process and that has an interface, wherein the interface is able to receive, from an instruction operation service via a network, a first written instruction for performing a setting process on or configuration control of the image forming apparatus, the control method comprising:
- identifying a second command using information included in a first command contained in the first written instruction, wherein the second command corresponds to the first command and provides a process for canceling a process executed with the first command;
- generating, in a case where the second command has been identified and an instruction to execute the process provided by the first command is given according to the first written instruction, a second written instruction to execute the identified second command; and
- executing, according to a user operation, the generated second written instruction.

10. The control method according to claim 9,
wherein the first command is a command to give an instruction to install a first application on the image forming apparatus, and
wherein the second command at least includes a command to give an instruction to uninstall the first application installed on the image forming apparatus.

11. The control method according to claim 10, wherein the second command includes a command to give an instruction to install a second application to be installed on the image forming apparatus before the first application is installed.

12. The control method according to claim 11, wherein the first application and the second application are applications different in version from each other.

13. The control method according to claim 11, wherein the second written instruction to execute the second command includes information regarding a license of the second application.

14. The control method according to claim 11, wherein the second written instruction to execute the second command includes identification information regarding the second application and information regarding a version of the second application.

15. The control method according to claim 9,
wherein the user operation is an operation for cancelling a process executed with the first command, and
wherein the image forming apparatus further comprises an interface configured to receive the user operation.

16. The control method according to claim 15, wherein the interface is a screen configured to display a plurality of processes included in the setting process executed by the image forming apparatus, and wherein a user is able to select, through the screen, a process executed with the first command as a cancellation target.

17. A non-transitory computer readable storage medium storing instructions that, when executed, cause an image forming apparatus to perform a process, the image forming apparatus having an interface, wherein the interface is able to receive, from an instruction operation service via a network, a first written instruction for performing a setting process on or configuration control of the image forming, the process comprising:
- identifying a second command using information included in a first command contained in the first written instruction, wherein the second command corresponds to the first command and provides a process for canceling a process executed with the first command;
- generating, in a case where the second command has been identified and an instruction to execute the process provided by the first command is given according to the first written instruction, a second written instruction to execute the identified second command; and
- executing, according to a user operation, the generated second written instruction.

\* \* \* \* \*